Daniel Dillenback's
Improved Plow Jointer.
108771  PATENTED Nov 1 1870
Fig 3
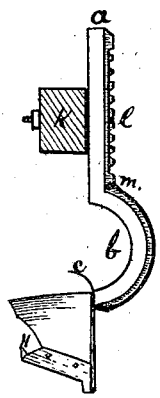
Fig. 2
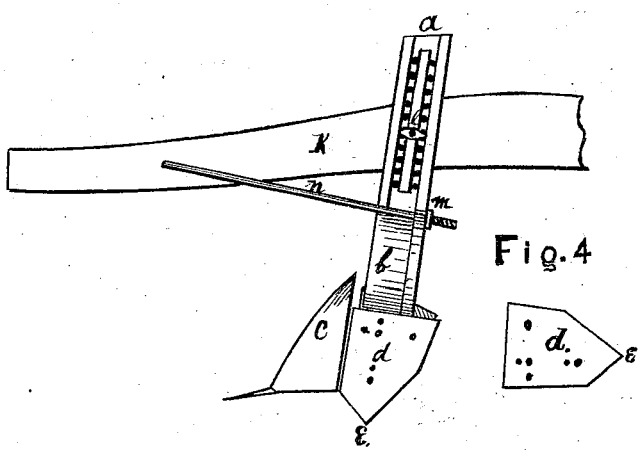
Fig. 4
Fig. 1.
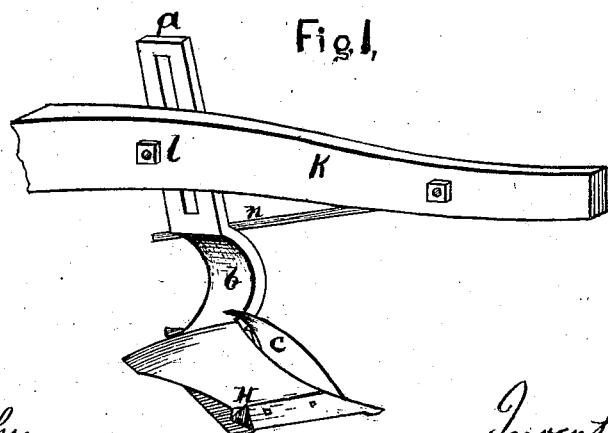
Witnesses
Henry Upjohn
U Upjohn
Inventor
Daniel Dillenback

United States Patent Office.

DANIEL DILLENBACK, OF GALESBURG, MICHIGAN.

Letters Patent No. 108,771, dated November 1, 1870.

IMPROVEMENT IN PLOW-JOINTERS.

The Schedule referred to in these Letters Patent and making part of the same.

I, DANIEL DILLENBACK, of Galesburg, in the county of Kalamazoo, State of Michigan, have invented certain Improvements in Plow-Jointers, of which the following is a specification.

The first part of my invention relates to the providing of an ordinary share and mold-board, of suitable size for the purpose, with cutting parts, in such a manner as to cut clear a portion of the inner angle or corner of the furrow, and also cut the soil below the part removed by the jointer-plow, the object of this part of my invention being to render the inversion or folding of the inner angle or part of the furrow upon the main portion more complete and with less draft, at the same time cutting the earth or sod beneath the jointer.

The second part of my invention relates to the combination of a peculiarly-formed cutter, with a curved standard, in such a manner as to entirely obviate the possibility of the plow being clogged by straw, grass, or other obstructions.

Description of the Accompanying Drawing.

Figure 1 is a perspective view of jointer as secured to plow.

Figure 2 is a side elevation, showing land-side.

Figure 3 is a direct front view.

Figure 4 is a detached view of cutter-blade deprived of its lower cutting extremity or part.

Figure 5 is a detached view of cutter-blade complete.

$a$ is a standard or form to which the other parts of the jointer are attached, said standard being curved out toward the land, at shown at $b$, so as to allow of more room for the free passage of obstructions.

$c$ is a long cutting-blade which is secured by means of bolt or screw to the lower end, at the land side of standard or form $a$, said standard being provided with a gain or slot to receive it, as shown at $d$.

By this means both extremities of said blade are left free, the upper one being curved backward and over in the direction which the furrow is turned to conduct obstructions back into the furrow; the lower end has its front and cutting-edge slanted back, as shown at $e$, to facilitate the discharge of roots and the like, which may gather upon its edge.

Fig. 4 is a cutting-blade deprived of its lower cutting portion, to be used when stone or other obstructions may render it necessary.

The front angle of the rear extremity of the share is turned up, as shown at H, nearly parallel with cutting-blade $c$, so as to form a cutter which shall cut the outer angle of the small furrow free from the adjoining sod.

The whole firmly secured to plow-beam $k$ by means of bolt $l$ and rod $n$, one end of said rod being fastened to front end of plow-beam, the rear end of rod $n$ passing through projection $m$, on standard $a$, and provided with a screw and nut, for the purpose of adjusting and holding the jointer securely to any angle which may be desired.

The standard $a$, in combination with the upper portion of blade $c$, to be used independent of the other cutting parts, for the purpose specified, on large two or three-horse plows, also, properly arranged for gang-plows.

Claims.

I claim as my invention—

The combined arrangement of curved standard $a$, with cutting-blade $c$, reversible land-side $d$, and draw-rod $n$, substantially as described and for the purpose hereinbefore set forth.

DANIEL DILLENBACK.

Witnesses:
H. U. UPJOHN,
R. G. SMITH.